(12) United States Patent
Yamasaki et al.

(10) Patent No.: US 8,339,460 B2
(45) Date of Patent: Dec. 25, 2012

(54) VIDEO SIGNAL PROCESSING INTEGRATED CIRCUIT

(75) Inventors: Shinichi Yamasaki, Hanyu (JP);
Masanori Okubayashi, Ota (JP);
Kazuyoshi Oshima, Gunma-ken (JP)

(73) Assignees: Semiconductor Components Industries, LLC, Phoenix, AZ (US);
Sanyo Semiconductor Co., Ltd., Gunma (JP)

( * ) Notice: Subject to any disclaimer, the term of this patent is extended or adjusted under 35 U.S.C. 154(b) by 1216 days.

(21) Appl. No.: 12/122,378

(22) Filed: May 16, 2008

(65) Prior Publication Data
US 2008/0284852 A1    Nov. 20, 2008

(30) Foreign Application Priority Data

May 17, 2007    (JP) .................................. 2007-131667

(51) Int. Cl.
*H04N 17/00*    (2006.01)

(52) U.S. Cl. ...................................................... 348/181

(58) Field of Classification Search .................. None
See application file for complete search history.

(56) References Cited

U.S. PATENT DOCUMENTS

| 5,483,289 A | * | 1/1996 | Urade et al. ................... 348/468 |
| 5,495,245 A | * | 2/1996 | Ashe ............................. 341/145 |
| 6,636,268 B1 | * | 10/2003 | Ngai ............................. 348/478 |
| 7,103,800 B2 | * | 9/2006 | Hasako et al. ................... 714/25 |
| 2003/0086001 A1 | * | 5/2003 | Zeidler .......................... 348/183 |

FOREIGN PATENT DOCUMENTS

| JP | 63-158976 | | 7/1988 |
| JP | 06-178318 | | 6/1994 |
| JP | 1994-178318 | * | 6/1994 |

OTHER PUBLICATIONS

Japan Patent Office, Notification of Reasons for Rejection for Application No. 2007-131667, Mail Date Aug. 21, 2012.

* cited by examiner

*Primary Examiner* — Vivek Srivastava
*Assistant Examiner* — Rong Le
(74) *Attorney, Agent, or Firm* — SoCal IP Law Group LLP; Steven C. Sereboff; John E. Gunther

(57) ABSTRACT

A video signal processing integrated circuit comprising: a test signal generation circuit configured to generate a test signal in conformity with video additional data superimposed on a video signal; a data slicer configured to binarize the test signal through comparison with a slice level, the test signal being supplied from the test signal generation circuit; and a data processing circuit configured to perform data processing of the video additional data binarized by the data slicer.

3 Claims, 6 Drawing Sheets

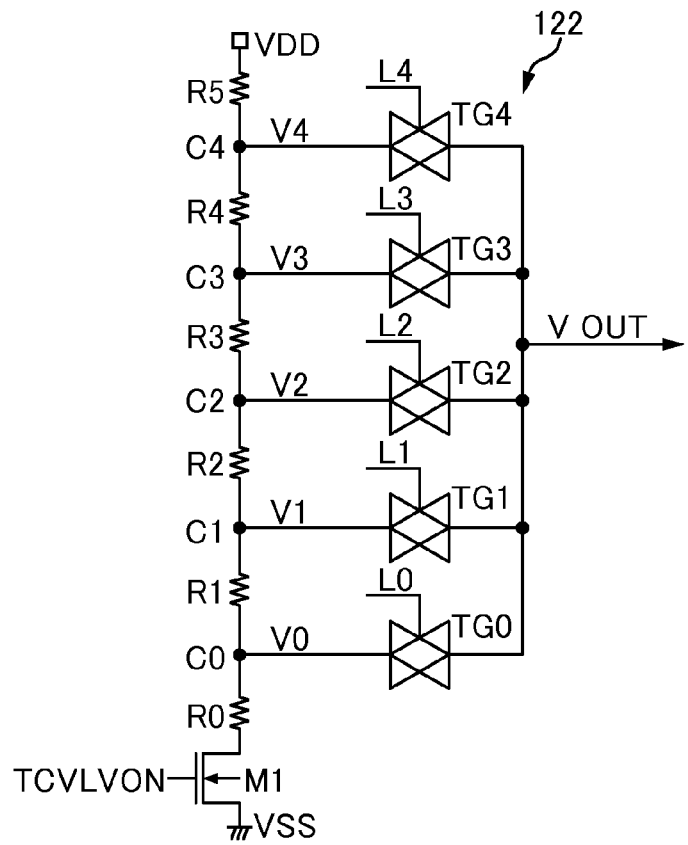
FIG. 2
FIG. 3A
| TCVLVS0 | TCVLVS1 | TCVLVS2 | TCVLVS |
|---|---|---|---|
| 0 | 0 | 0 | L0 |
| 0 | 0 | 1 | L1 |
| 0 | 1 | 0 | L2 |
| 0 | 1 | 1 | L3 |
| 1 | 0 | 0 | L4 |
FIG. 3B

VIDEO SIGNAL PROCESSING INTEGRATED CIRCUIT

CROSS-REFERENCE TO RELATED APPLICATION

This application claims the benefit of priority to Japanese Patent Application No. 2007-131667, filed May 17, 2007, of which full contents are incorporated herein by reference.

BACKGROUND OF THE INVENTION

1. Field of the Invention

The present invention relates to a video signal processing integrated circuit.

2. Description of the Related Art

When displaying a television screen, the interlaced scan is usually performed and, for example, as shown in FIG. 6, a screen of one frame is displayed by scanning one frame twice separately for an odd field and an even field. Specifically, in the interlaced scan, all the scan lines of the odd field are line-by-line scanned from the top to the bottom of the television screen. After the scanning of the odd field, all the scan lines of the even field are scanned from the top to the bottom of the television screen such that the gaps of all the scan lines of the odd field are filled in. By repeating such scanning of the odd field and the even field, a television screen is displayed.

Each time the horizontal scan from left to right is completed for one scan line in each field, the horizontal scan position is require to be moved from right to left to start the horizontal scan for the next scan line. Such a line for moving the horizontal scan position within the field is referred to as a "horizontal retrace line", and a time set for this horizontal retrace line is referred to as "horizontal blanking interval". When scanning from a present scan field to a next scan field, the vertical scan position must also be moved from bottom to top. Such a line for moving the vertical scan position between the fields is referred to as a "vertical retrace line", and a time set for this vertical retrace line is referred to as a "vertical blanking interval (VBI)". Since the vertical blanking interval is an interval caused based on a physical requirement for returning an electron beam from bottom to top of the television screen, for example, in the case of cathode-ray tubes; and is meaningless in terms of signal transmission, the interval is utilized for the teletext (character multiplex broadcast), EPG (Electronic Program Guide), etc.

The teletext is a system that displays additional characters and graphics in addition to normal video display: by transmitting a signal of encoded characters and graphics (hereinafter referred to as teletext signal) superimposed within the vertical blanking interval of a video signal on a transmitting side; and by extracting and decoding the teletext signal from the received video signal on a receiving side. For example, the teletext is employed in the closed caption (closed caption broadcasting) for displaying the concomitantly sent additional information in television programs as a caption on the television screen.

The EPG is a system that displays the EPG in addition to normal video display: by transmitting a signal of encoded television program listing (hereinafter referred to as EPG signal) superimposed within the vertical blanking interval of a video signal on the transmitting side; and by extracting and decoding the EPG signal from the received video signal on the receiving side. For example, the EPG is used in conjunction with a recording reservation function of a DVD recorder connected to a television receiver.

FIG. 7 depicts an outline of a format of a video signal with video additional data such as a teletext signal and EPG signal superimposed in the vertical blanking interval. Within the vertical blanking interval, equalizing pulses, vertical synchronization pulses, and equalizing pulses are arranged in this order, and the video additional data are superimposed as a portion of VBI data (data transmitted with the use of VBI) after the arrangement. The vertical synchronization signal is a signal for identifying the start of the vertical blanking interval. The vertical synchronization pulses are pulses inserted for every field. The equalizing pulses are pulses for equalization disposed before and after the vertical synchronization pulses to separate the vertical synchronization pulses of each field.

FIG. 8 depicts a format of a video signal representing the superimposed portion of VBI data as shown in a dash-line portion of FIG. 7. In the superimposed portion of VBI data, a horizontal synchronization signal, a color burst signal, and VBI data are arranged in this order, and the VBI data are made up of a clock run-in, a flaming code, and video additional data. The horizontal synchronization signal is a signal for identifying the start of each line in the field and has a waveform falling from 0-level to synchronization level, maintaining the synchronization level for a predetermined period, and returning from the synchronization level to the 0-level. The color burst signal is a color synchronization signal for color reproduction and has a waveform oscillating relative to the 0-level. The clock run-in is a reference clock string for dividing periods of bit data of the video signal and has a pulse-train-shaped waveform oscillating between the 0-level and 1-level. The flaming code is code information for dividing the periods of the minimum byte of the video signal and has a pulse-train-shaped waveform oscillating between the 0-level and 1-level.

A video signal processing integrated circuit 100 processing the video signal with the VBI data superimposed as above is provided with a VBI data slicer 110 as shown in FIG. 9 (see, e.g., Japanese Patent Application Laid-Open Publication No. Hei 6-178318). In FIG. 9, for convenience of description, a configuration other than the signal processing system of the VBI data is omitted.

As shown in FIG. 9, the VBI data slicer 110 is configured using a comparator 112, for example. The VBI data slicer 110 compares a video signal having a DC voltage adjusted by a clamp circuit 102 with a slice level VR to generate binarized VBI data of 0 or 1. A VBI data processing circuit 116 detects the clock run-in, the flaming code, and the video additional data based on the binarized VBI data generated by the VBI data slicer 110. The video additional data are divided into code data in units of byte by the clock run-in and the flaming code to be stored in a buffer memory 114. When the video additional data of one frame are stored in the buffer memory 114, the VBI data processing circuit 116 reads the video additional data of one frame stored in the buffer memory 114 to be supplied to the data to an RGB driver 118. As a result of this, there is generated the video additional data (characters, images, or EPG) displayed in addition to video on the television screen.

When conducting a shipment test of the video signal processing integrated circuit 100 equipped with the VBI data slicer 110, etc., a test signal generator generating an analog test signal compliant with the VBI data format is required to be prepared for a purpose such as detecting whether the VBI data slicer 110 can properly binarize the VBI data. However, the test signal generators are generally expensive and are unsuitable for the shipment test of mass-produced items since the reduction of test costs has recently been demanded. The shipment test, etc., are conducted based on a result of an operation of the VBI data slicer 110, etc., with an analog test signal from the test signal generator. Therefore, the shipment test may be conducted based on an unstable analog test signal due to external noises, etc., which may result in reducing yields.

SUMMARY OF THE INVENTION

A video signal processing integrated circuit according to an aspect of the present invention, comprises: a test signal generation circuit configured to generate a test signal in conformity with video additional data superimposed on a video signal; a data slicer configured to binarize the test signal through comparison with a slice level, the test signal being supplied from the test signal generation circuit; and a data processing circuit configured to perform data processing of the video additional data binarized by the data slicer.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which:

FIG. 2 depicts a configuration example of a test signal generator used for a video signal processing integrated circuit according to one embodiment of the present invention;

FIG. 3A depicts a configuration example of a control register used for a video signal processing integrated circuit according to one embodiment of the present invention;

FIG. 3B is an explanatory view of encoding of a switch signal by the control register shown in FIG. 3A;

DETAILED DESCRIPTION OF THE INVENTION

At least the following details will become apparent from descriptions of this specification and of the accompanying drawings.

Figure 1:
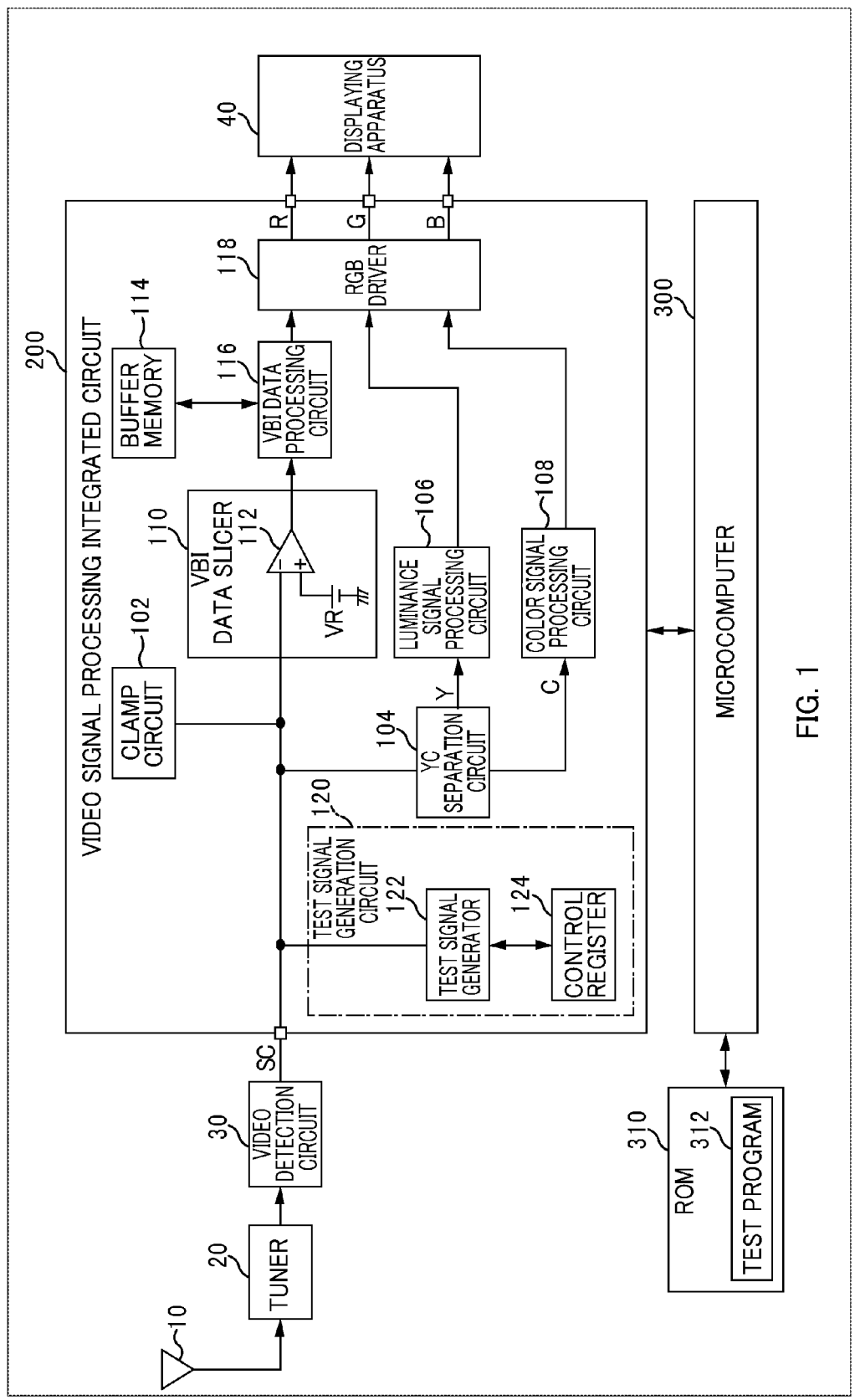
FIG. 1 depicts an overall configuration example of a television reception system to which a video signal processing integrated circuit according to one embodiment of the present invention is applied.
Figure 9:
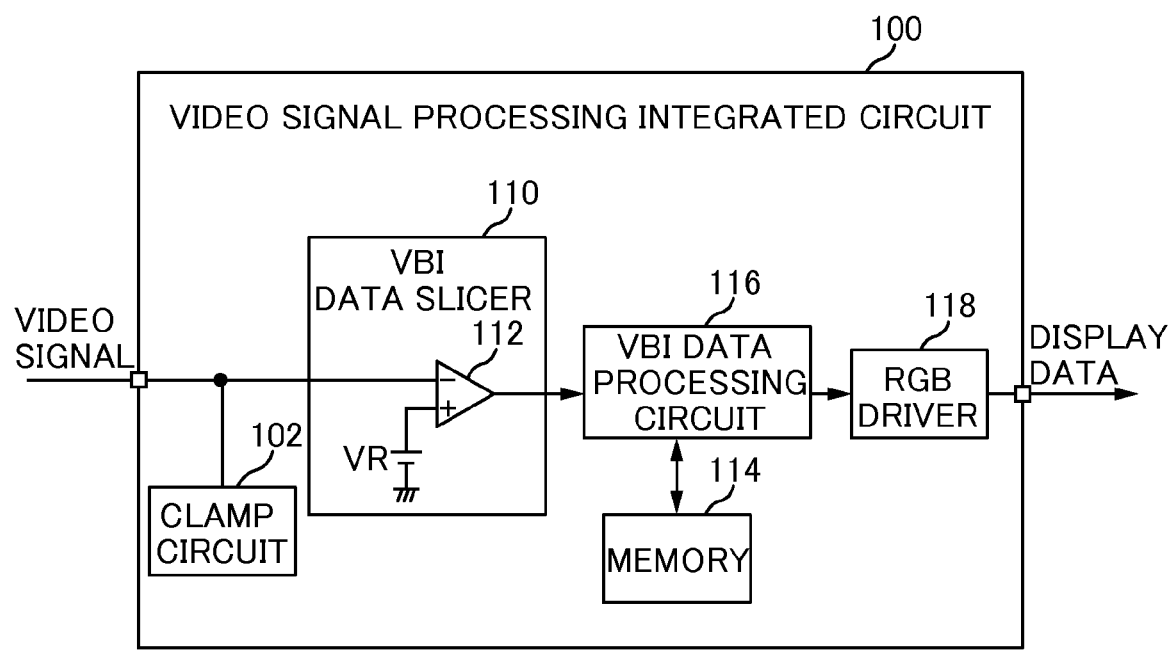
FIG. 9 depicts a configuration of a video signal processing integrated circuit.

FIG. 1 is an overall configuration view of a television reception system including a video signal processing integrated circuit 200 according to one embodiment of the present invention. With regard to constituent elements of the video signal processing integrated circuit 200, the same reference numerals are added to the same constituent elements as those shown in FIG. 9.

The video signal processing integrated circuit 200 is an integrated circuit that executes various signal processes for a received video signal and is operated under centralized control of a microcomputer 300 for overall signal processes. The microcomputer 300 is connected in an accessible manner to a ROM 310 having stored therein a test program 312 in which a procedure, etc. are programmed for generating a waveform pattern of a test signal VOUT, so as to conduct the test of the video signal processing integrated circuit 200 according an embodiment of the preset invention.

The video signal to be processed by the video signal processing integrated circuit 200 are a signal compliant with the NTSC (National Television Standards Committee) system, the PAL (Phase Alternation by Line) system, the SECAM (Sequential Couleur A Memoire) system, etc., and have video data of three primary colors shot by a television camera. The video signal is a signal in which video additional data such as text/image information for teletext or television broadcasting program information for EPG are superimposed on the VBI. Specifically, the video data of three primary colors shot by the television camera are made up of a luminance signal Y representing brightness of a screen and a chrominance signal C representing a degree of shade of color on the screen, and a composite signal SC obtained by synthesizing the luminance signal Y, the chrominance signal C, and the VBI data such as the video additional data is sent as the video signal to an antenna 10 of the television reception system.

A tuner 20 extracts the video signal of a channel that is a reception target among the video signals received by the antenna 10, to be output. In a video detection circuit 30, an intermediate frequency component is extracted from the video signal output by the tuner 20 and thereafter, the extracted component is detected so that the composite signal SC is output. The clamp circuit 102 adjusts: the DC level (pedestal level) of the composite signal SC detected by the video detection circuit 30; to a level suitable for processes of circuits on the subsequent stages.

A YC separation circuit 104 performs sync separation for the composite signal SC processed by the clamp circuit 102 so that the composite signal SC is separated into the luminance signal Y and the chrominance signal C. A luminance signal processing circuit 106 adjusts contrast, blanking, etc., of the luminance signal Y supplied from the YC separation circuit 104. A color signal processing circuit 108 adjusts gain of the chrominance signal C supplied from the YC separation circuit 104, and thereafter, performs demodulation, etc., of color-difference signals R-Y, B-Y obtained by subtracting the luminance signal Y.

The VBI data slicer 110 is configured using a comparator 112, for example. The VBI data slicer 110 compares the video signal having a DC voltage adjusted by the clamp circuit 102 with a slice level VR, to generate the binarized VBI data obtained by binarizing VBI data into 0 or 1.

Figure 8:
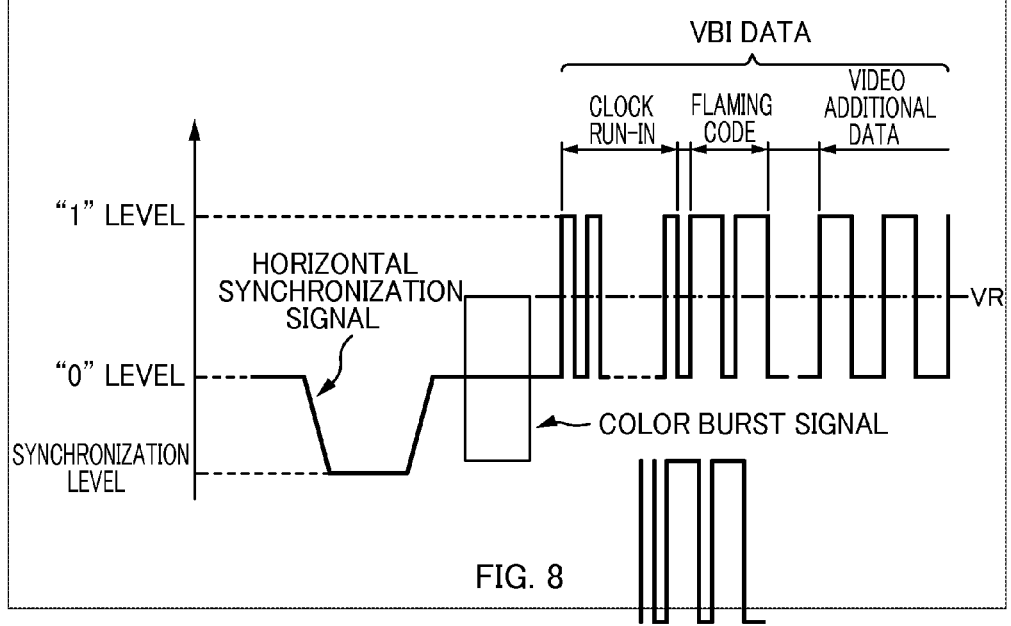
FIG. 8 is an explanatory view of a format of a video signal.

The VBI data processing circuit 116 detects clock run-in, flaming code, and the video additional data shown in FIG. 8 based on the binarized VBI data generated by the VBI data slicer 110. The video additional data are divided into code data in units of byte by the clock run-in and the flaming code, to be stored in a buffer memory 114. When the video additional data of one frame are stored in the buffer memory 114, the VBI data processing circuit 116 reads the video additional data of one frame stored in the buffer memory 114 to be supplied to an RGB driver 118.

The RGB driver 118 combines the video additional data supplied from the VBI data processing circuit 116, the color-difference signals R-Y, B-Y demodulated by the color signal processing circuit, and the luminance signal Y subjected to various processes by the luminance signal processing circuit, to generate R, G, and B signals to be displayed on a television screen. As a result, a displaying apparatus 40 receives the R, G, and B signals from the RGB driver 118 and displays the text and image information for the teletext or the television broadcast program listing for the EPG while the television screen display is produced.

A test signal generator 122 and a control register 124 are one embodiment of a test signal generator 120 according to the present invention.

The test signal generator 122 generates the test signal VOUT used when testing the video signal processing integrated circuit 200, especially when testing an operation, etc., of the VBI data slicer 110. The test signal VOUT is an analog signal in conformity with a format waveform within a vertical blanking interval of the video signal superimposed on the VBI data as shown in FIG. 8.

A configuration example of the test signal generator 122 is shown in FIG. 2. Between a ground potential VSS and a power-supply potential VDD, a series connection is provided by connecting in series an NMOS transistor M1 and resistors R0 to R5 from the round potential VSS toward the power-supply potential VDD. A test enable signal TCVLVON is applied from the control register 124 to a gate electrode of the NMOS transistor M1.

A transmission gate TG0 (analog switch) is turned on/off based on a switch signal L0 from the control register 124. An electric potential V0 at a connection point c0 between the resistor R0 and the resistor R1 is corresponds with a synchronization level after the falling of the horizontal synchronization signal shown in FIG. 8.

A transmission gate TG1 (analog switch) is turned on/off based on a switch signal L1 from the control register 124. An electric potential V1 at a connection point c1 between the resistor R1 and the resistor R2 corresponds with a 0-level (one binarized level of the video additional data) of the VBI data (video additional data) shown in FIG. 8.

A transmission gate TG2 (analog switch) is turned on/off based on a switch signal L2 from the control register 124. An electric potential V2 at a connection point c2 between the resistor R2 and the resistor R3 corresponds with one-third of a 1-level relative to the 0-level of the VBI data shown in FIG. 8.

A transmission gate TG3 (analog switch) is turned on/off based on a switch signal L3 from the control register 124. An electric potential V3 at a connection point c3 between the resistor R3 and the resistor R4 corresponds with two-thirds of the 1-level relative to the 0-level of the VBI data (video additional data) shown in FIG. 8.

A transmission gate TG4 (analog switch) is turned on/off based on a switch signal L4 from the control register 124. An electric potential V4 at a connection point c4 between the resistor R4 and the resistor R5 corresponds with the 1-level of the VBI data shown in FIG. 8 (the other binarized level of the video additional data).

With a configuration described above, the test signal generator 122 can combine outputs of the transmission gates TG0 to TG4 to generate the test signal VOUT of the data slicer in conformity with a format waveform within the vertical blanking interval of the video signal.

The control register 124: is a multiple-bit register used for controlling the NMOS transistor M1 and the transmission gates TG0 to TG4 as to on/off of the test signal generator 122; and has a bit value set by the microcomputer 300 stored therein. As shown in FIG. 3A, the control register 124 is made up of a 4-bit register, for example. The control register 124 is not limited to a 4-bit register and may be made up of an 8-bit register, a 16-bit register, etc., in accordance with the number of bits that the microcomputer 300 can handle.

In the control register 124, a set value of the test enable signal TCVLVON is stored at the most significant bit MSB. When the most significant bit MSB is set to one, the test enable signal TCVLVON becomes one, and the NMOS transistor M1 is turned on. As a result, the electric potentials of the connection points c0 to c4 are determined thereby becoming in a state where the test signal VOUT can be generated. On the other hand, when the most significant bit MSB is set to zero, the test enable signal TCVLVON becomes zero, and the NMOS transistor M1 is turned off. As a result, the electric potentials of the connection points c0 to c4 are not determined and become Hi-Z (high impedance), thereby becoming in a state where the test signal VOUT cannot be generated.

In the control register 124, at a total of three bits from the least significant bit LSB to the (most significant bit MSB-1) bit, level setting codes TCVLVS0 to TCVLVS2 are stored that are obtained by 3-bit encoding the switch signals L0 to L4. FIG. 3B shows correspondence between the level setting codes TCVLVS0 to TCVLVS2 and the switch signals L0 to L4. That is, when the level setting codes TCVLVS0 to TCVLVS2 are (000), only the switch signal L0 is one and other signals are zero; in a case of (001), only the switch signal L1 is one and others are zero; in a case of (010), only the switch signal L2 is one and others are zero; in a case of (011), only the switch signal L3 is one and others are zero; and in a case of (100), only the switch signal L4 is one and others are zero.

A flow of a test of the video signal processing integrated circuit 200 will hereinafter be described with reference to a flowchart shown in FIG. 4. It is assumed that the most significant bit is set to zero and that the level setting codes TCVLVS0 to TCVLVS2 are set to (001) as an initial setting of the control register 124.

First, the microcomputer 300 sets the level setting codes TCVLVS0 to TCVLVS2 of the control register 124 to (000) (S400). As a result, the switch signal L0 becomes one with the switch signals L1 to L4 being zero, and the transmission gate TG0 is turned on with the transmission gates TG1 to TG4 being turned off. By setting the most significant bit of the control register 124 to one in such a state, the test enable signal TCVLVON is set to 1 (S401), so that a level of the test signal VOUT becomes the electric potential V0 (synchronization level) of the connection point c0. The microcomputer 300 becomes in the NOP (Non OPeration) state in which nothing is executed during the period T0 (S402). As a result, there is simulated a waveform of the horizontal synchronization signal of the video signal so that a pseudo waveform is obtained.

The microcomputer 300 then sets the level setting codes TCVLVS0 to TCVLVS2 of the control register 124 to (001) (S403). As a result, the switch signal L1 becomes one with the switch signals L0 and L2 to L4 being zero, and the transmission gate TG1 is turned on with the transmission gates TG0 and TG2 to TG4 being turned off. That is, the level of the test signal VOUT becomes the electric potential V1 (0-level) of the connection point c1. The microcomputer 300 becomes in the NOP state in which nothing is executed during the period T1 (S404). As a result, there is simulated a waveform of the 0-level (pedestal level) of the VBI data superimposed on the video signal so that a pseudo waveform is obtained.

The microcomputer 300 then sets the level setting codes TCVLVS0 to TCVLVS2 of the control register 124 to (010) (S405). As a result, the switch signal L2 becomes one with the switch signals L0, L1, L3, and L4 being zero, and the transmission gate TG2 is turned on with the transmission gates TG0, TG1, TG3, and TG4 being turned off. That is, the level of the test signal VOUT becomes the electric potential V2 (level of one-third between the 0-level and the 1-level) of the connection point c2. The microcomputer 300 becomes in the NOP state in which nothing is executed during the period T2 (S406). As a result, there is simulated a first half process of rising from the 0-level to the 1-level of the VBI data superimposed on the video signal so that a pseudo waveform of the first half process is obtained.

The microcomputer 300 then sets the level setting codes TCVLVS0 to TCVLVS2 of the control register 124 to (011) (S407). As a result, the switch signal L3 becomes one with the switch signals L0 to L2, and L4 being zero, and the transmission gate TG3 is turned on with the transmission gates TG0 to TG2, and TG4 being turned off. That is, the level of the test signal VOUT becomes the electric potential V3 (level of two-thirds between the 0-level and the 1-level) of the connection point c3. The microcomputer 300 becomes in the NOP state in which nothing is executed during the period T3 (S408). As a result, there is simulated a second half process of rising from the 0-level to the 1-level of the VBI data superimposed on the video signal so that a pseudo waveform of the second half process is obtained.

The microcomputer 300 then sets the level setting codes TCVLVS0 to TCVLVS2 of the control register 124 to (100) (S409). As a result, the switch signal L4 becomes one with the switch signals L0 to L3 being zero, and the transmission gate TG4 is turned on with the transmission gates TG0 to TG3 being turned off. That is, the level of the test signal VOUT becomes the electric potential V4 (1-level) of the connection point c4. The microcomputer 300 becomes in the NOP state in which nothing is executed during the period T4 (S410). As a result, there is simulated the 1-level of the VBI data superimposed on the video signal so that a pseudo waveform of the 1-level is obtained.

The microcomputer 300 then sets the level setting codes TCVLVS0 to TCVLVS2 of the control register 124 to (011) (S411). As a result, the switch signal L3 becomes one with the switch signals L0 to L2, and L4 being zero, and the transmission gate TG3 is turned on with the transmission gates TG0 to TG2, and TG4 being turned off. That is, the level of the test signal VOUT becomes the electric potential V3 (level of two-thirds between the 0-level and the 1-level) of the connection point c3. The microcomputer 300 becomes in the NOP state in which nothing is executed during the period T5 (S412). As a result, there is simulated a first half process of falling from the 1-level to the 0-level of the VBI data superimposed on the video signal so that a pseudo waveform of the first half process is obtained.

The microcomputer 300 then sets the level setting codes TCVLVS0 to TCVLVS2 of the control register 124 to (010) (S413). As a result, the switch signal L2 becomes one with the switch signals L0, L1, L3, and L4 being zero, and the transmission gate TG2 is turned on with the transmission gates TG0, TG1, TG3, and TG4 being turned off. That is, the level of the test signal VOUT becomes the electric potential V2 (level of one-third between the 0-level and the 1-level) of the connection point c2. The microcomputer 300 becomes in the NOP state in which nothing is executed during the period T6 (S414). As a result, there is simulated a second half process of falling from the 1-level to the 0-level of the VBI data superimposed on the video signal so that a pseudo waveform of the second half process is obtained.

The microcomputer 300 then sets the level setting codes TCVLVS0 to TCVLVS2 of the control register 124 to (001) (S415). As a result, the switch signal L1 becomes one with the switch signals L0, L2 to L4 being zero, and the transmission gate TG1 is turned on with the transmission gates TG0, TG2 to TG4 being turned off. That is, the level of the test signal VOUT becomes the electric potential V1 (0-level) of the connection point c1. The microcomputer 300 becomes in the NOP state in which nothing is executed during the period T7 (S416). As a result, there is simulated a waveform of the 0-level of the VBI data superimposed on the video signal so that a pseudo waveform of the 0-level is obtained.

Figure 4:
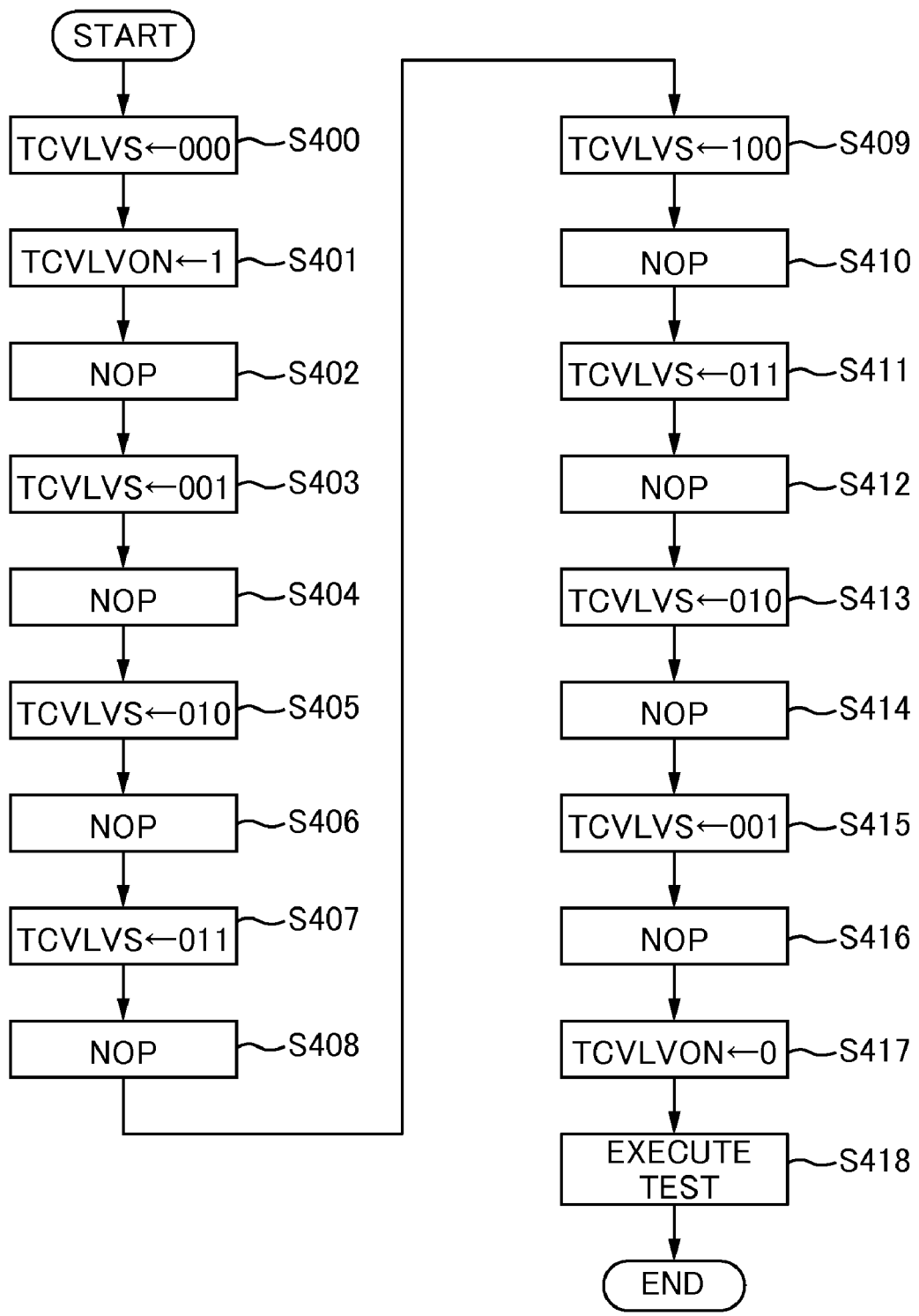
FIG. 4 is a flowchart of a test operation flow of a video signal processing integrated circuit according to one embodiment of the present invention.
Figure 5:
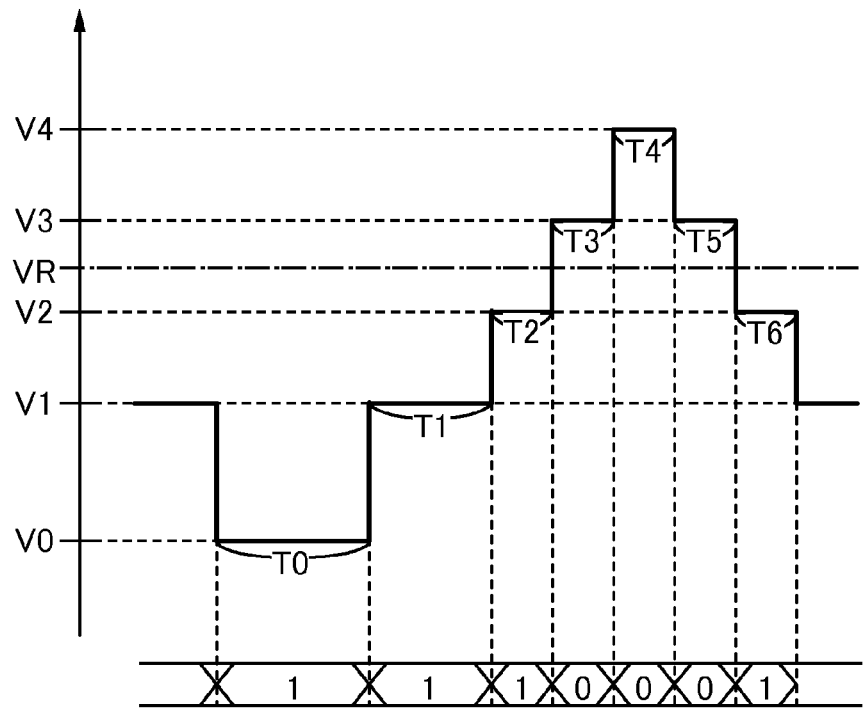
FIG. 5 depicts a waveform diagram of a test signal generated by a video signal processing integrated circuit according to one embodiment of the present invention.
Figure 6:
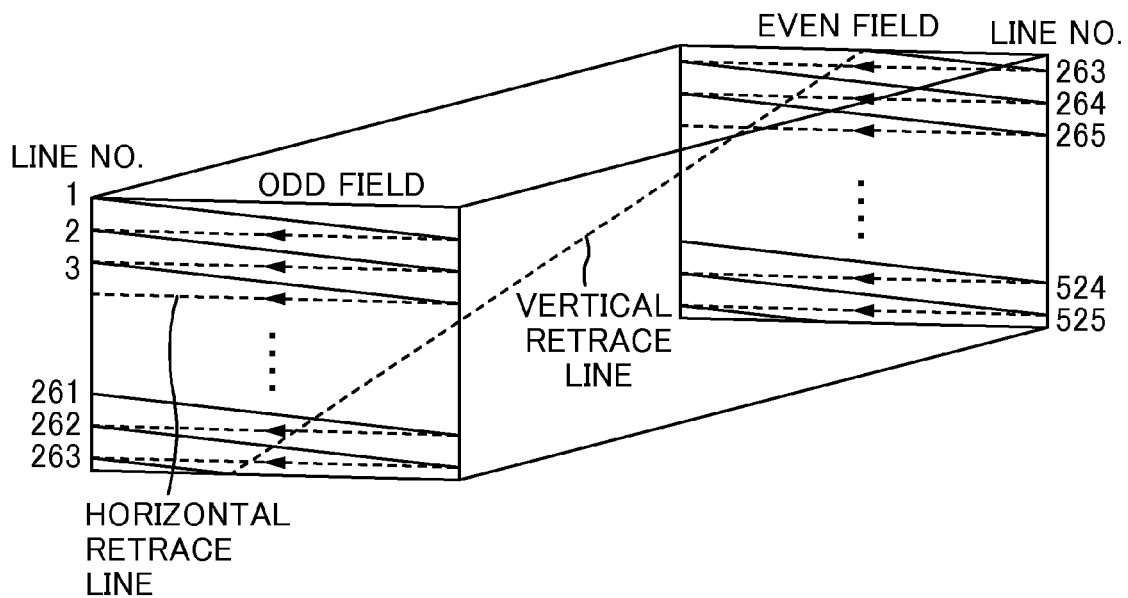
FIG. 6 is an explanatory view of interlaced scan.
Figure 7:
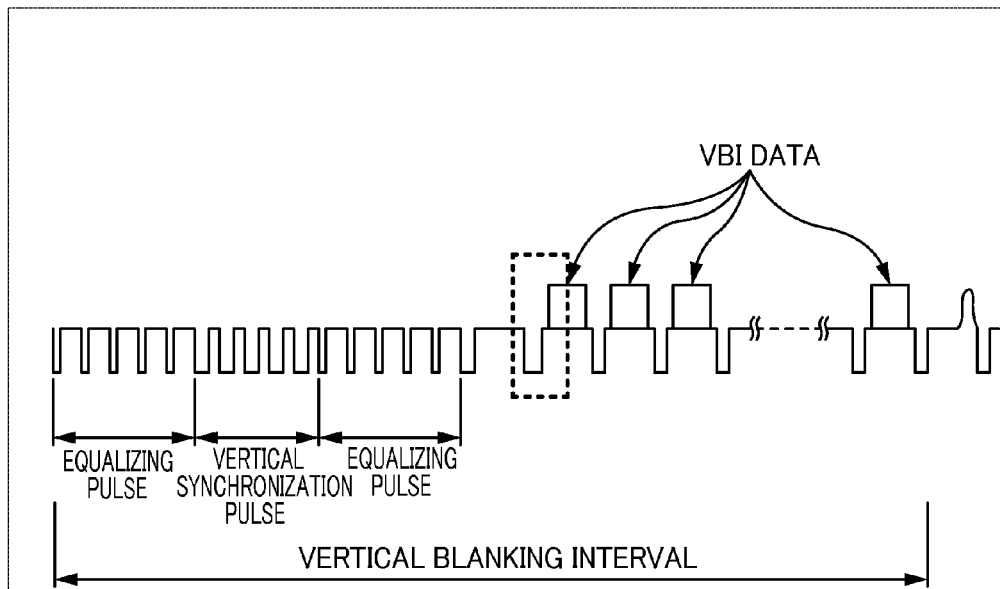
FIG. 7 is an explanatory view of a format of a video signal.

FIG. 5 depicts a waveform diagram of the test signal VOUT generated based on the test program 312 shown in FIG. 4 as described above. It is assumed here that the slice level VR used by the VBI data slicer 110 is a level between the electric potential V2 of the connection point c2 and the electric potential V3 of the connection point c3. In this case, if the VBI data slicer 110 is normal, the binarized VBI data output from the VBI data slicer 110 are "1" in the case of the period T0, "1" in the case of the period T1, "1" in the case of the period T2, "0" in the case of the period T3, "0" in the case of the period T4, "0" in the case of the period T5, and "1" in the case of the period T6.

The microcomputer 300 sets the most significant bit of the control register 124 to zero (s417). Therefore, the test enable signal TCVLVON becomes zero and the NMOS transistor M1 is turned off. As a result, the supply of the test signal VOUT to the VBI data slicer 110 stops. The microcomputer 300 has an expected value of the binarized VBI data for each of the periods T0 to T6 preliminarily stored in the ROM 310 along with the test program 312, and after the test signal is generated, detects whether the VBI data slicer 110 is normal by reading the actual measured value of the binarized VBI data stored in the buffer memory 114 to be checked against the expected value (S418).

The test can appropriately be conducted for the video signal processing integrated circuit including the data slicer that compares the video additional data superimposed on the video signal with the slice level for binarization, as described above. Specifically, when testing the VBI data slicer 110, an external test signal generator does not have to be prepared for generating the test signal superimposed on the VBI data. Therefore, reduction of the test costs can be realized. Since the VBI data slicer 110 can be tested without supplying from an external test signal generator the an analog test signal that may be easily affected by noises corresponding to the video signal superimposed on the VBI data, the test quality can be improved.

Since the waveform format within the vertical blanking interval of the video signal is simulated to obtain a pseudo waveform of the waveform format as a binary test signal VOUT of the electric potential V1 indicating the 0-level of the VBI data and the electric potential V4 indicating the 1-level of the VBI data by focusing on a waveform portion of the VBI data, a test circuit configuration can be simplified and the test quality can be improved in a well-balanced manner. The test signal VOUT as above can be generated by a simple hardware configuration of the test signal generation circuit 120 including: the series connection in which the NMOS transistor M1 and the resistors R0 to R5 are serially connected; the transmission gates TG1 and TG4; and the control register 124.

The waveform portion of the horizontal synchronization signal disposed before the VBI data may also be simulated as the test signal VOUT with the use of the electric potential V0 indicating the synchronization level of the horizontal synchronization signal along with the electric potential V1 indicating the 0-level of the VBI data and the electric potential V4 indicating the 1-level of the VBI data. This enables the format waveform of the video signal to be obtained more accurately, so that the test quality is expected to be further improved.

As the test signal VOUT there can be obtained the VBI data as a pseudo sinusoidal wave with the electric potentials V2 and V3 added as intermediate levels between the electric potential V1 indicating the 0-level of the VBI data and the electric potential V4 indicating the 1-level of the VBI data. This enables the format waveform of the video signal to be represented more accurately, so that the test quality is expected to further be improved. This is because an actual waveform of the VBI data superimposed on the video signal has a sinusoidal-shaped waveform rather than a rectangular-shaped waveform.

The test signal VOUT may be a constant signal at the electric potential V1 indicating the 0-level of the VBI data or may be a constant signal at the electric potential V4 indicating the 1-level of the VBI data. This enables a test of whether the VBI data slicer 110 can output the 0-level or the 1-level of the VBI data with stability.

There is employed an arrangement, where the control register 124 having bit values set by the microcomputer 300 controls the NMOS transistor M1 and the transmission gates TG0 to TG4 of the test signal generator 122 as to on/off so that the test signal VOUT is generated. Therefore, after a command for starting a test, etc. is sent from the outside to the microcomputer 300, the self-completed test can be conducted in the video signal processing integrated circuit 200. Therefore, common semiconductor testers (memory testers, microcomputer testers, and logic testers) can easily be used for the test of the video signal processing integrated circuit 200, and further reduction of the test costs is expected. Furthermore, since the test program 312 performed by the microcomputer 300 is used in this configuration, a hardware configuration of the test signal generation circuit 120 can further be simplified.

The VBI data slicer 110 binarizes not only the VBI data superimposed within the vertical blanking interval of the video signal but also the entire video signal detected by the video detection circuit 30. Therefore, since there may be a case in which the video additional data such as teletext information are superimposed within the horizontal blanking interval of the video signal, in such a case, the test of the VBI data slicer 110 may be performed by generating the test signal VOUT in conformity with such video additional data within the horizontal blanking interval and supplying the signal to the VBI data slicer.

The above embodiments of the present invention are simply for facilitating the understanding of the present invention and are not in any way to be construed as limiting the present invention. The present invention may variously be changed or altered without departing from its spirit and encompass equivalents thereof.

What is claimed is:

1. A video signal processing integrated circuit comprising:
   a data slicer configured to binarize a video signal through comparison with a slice level, the video signal including superimposed video additional data;
   a data processing circuit configured to perform data processing of binarized video additional data output by the data slicer; and
   an internal test signal generation circuit configured to generate an analog test signal in conformity with video additional data superimposed on a video signal and provide the test signal to the data slicer as the video signal, wherein the test signal generation circuit includes:
      a series connection including a transistor, a first resistor for generating one binarized level of the video additional data, and a second resistor for generating the other binarized level of the video additional data, the transistor, the first resistor, and the second resistor being connected in series between a ground potential and a power-supply potential;
      a first analog switch configured to select the one binarized level generated by the first resistor to be output to the data slicer;
      a second analog switch configured to select the other binarized level generated by the second resistor to be output to the data slicer;
      a third resistor, connected between the transistor and the first resistor, configured to generate a synchronization level indicating a synchronization signal of the video signal;
      a third analog switch configured to select the synchronization level generated by the third resistor to be output to the data slicer; and
      a test control circuit configured to control the transistor and the first, second, and third analog switches as to on/off.

2. The video signal processing integrated circuit of claim 1, wherein
   the test signal falls from one binarized level of the video additional data to a synchronization level indicating a synchronization signal, the synchronization level being lower than the one binarized level; rises from the synchronization level to the one binarized level; and thereafter, oscillates between the one binarized level and the other binarized level of the video additional data, the other binarized level being higher than the one binarized level.

3. The video signal processing integrated circuit of claim 2, wherein
   the test control circuit includes a control register with a plurality of bits, each of the bits being set for a bit value for controlling the transistor and the first to the third analog switches as to on/off in accordance with a test program to be executed by a processor external to the video signal processing integrated circuit.

* * * * *